United States Patent
Bortolin

(10) Patent No.: US 9,346,428 B2
(45) Date of Patent: May 24, 2016

(54) SYSTEM AND METHOD FOR DETERMINING WHEN TO DEPLOY A VEHICLE SAFETY SYSTEM

(75) Inventor: Dino Bortolin, Novi, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 864 days.

(21) Appl. No.: 13/302,577

(22) Filed: Nov. 22, 2011

(65) Prior Publication Data

US 2013/0131929 A1  May 23, 2013

(51) Int. Cl.
*B60R 21/0136* (2006.01)
*B60R 21/0132* (2006.01)
*B60R 21/01* (2006.01)

(52) U.S. Cl.
CPC ....... *B60R 21/0136* (2013.01); *B60R 21/01336* (2014.12); *B60R 2021/01027* (2013.01)

(58) Field of Classification Search
CPC .............. B60R 21/0134; B60R 21/013; B60R 21/01516; B60R 21/0132; B60R 21/015; B60R 21/0136; B60R 21/01336; B60R 2021/01027
USPC .............. 701/45, 472, 517, 423, 117; 342/29, 342/988, 357.3, 357.31, 357.52, 61
See application file for complete search history.

(56) References Cited

U.S. PATENT DOCUMENTS

| | | | | |
|---|---|---|---|---|
| 5,087,068 | A * | 2/1992 | Fukanaga et al. | 280/5.508 |
| 6,023,664 | A * | 2/2000 | Bennet | 702/141 |
| 6,151,554 | A * | 11/2000 | Rodney | 702/9 |
| 6,418,097 | B1 * | 7/2002 | Schell et al. | 369/44.34 |
| 6,701,788 | B2 * | 3/2004 | Babala | 73/649 |
| 7,630,807 | B2 | 12/2009 | Yoshimura et al. | |
| 7,650,253 | B2 * | 1/2010 | Weed et al. | 702/104 |
| 8,874,477 | B2 * | 10/2014 | Hoffberg | 705/37 |
| 2009/0033540 | A1 * | 2/2009 | Breed et al. | 342/29 |
| 2009/0140887 | A1 * | 6/2009 | Breed et al. | 340/990 |
| 2010/0017066 | A1 * | 1/2010 | Lu et al. | 701/45 |
| 2010/0268423 | A1 * | 10/2010 | Breed | 701/45 |
| 2011/0111849 | A1 * | 5/2011 | Sprague et al. | 463/31 |
| 2012/0001463 | A1 * | 1/2012 | Breed et al. | 297/217.2 |
| 2012/0035788 | A1 * | 2/2012 | Trepagnier et al. | 701/3 |
| 2012/0065858 | A1 * | 3/2012 | Nickolaou et al. | 701/70 |
| 2012/0109458 | A1 * | 5/2012 | Sidlosky | 701/41 |
| 2012/0136573 | A1 * | 5/2012 | Janardhanan et al. | 701/512 |
| 2012/0143399 | A1 * | 6/2012 | Noumura et al. | 701/1 |
| 2012/0209505 | A1 * | 8/2012 | Breed et al. | 701/409 |
| 2012/0323474 | A1 * | 12/2012 | Breed et al. | 701/117 |

OTHER PUBLICATIONS

AutoIntelligence, "New generation of ESP® sensors". Issue 8, p. 2, Autumn 2009.*
O'Haver, Thomas. Fourier Convolution. Third paragraph.*
Bettina Merkelback, "New Bosch Sensor Measures Yaw Rate and Acceleration Simultaneously," ATZ Online, Mar. 25, 2011.

* cited by examiner

*Primary Examiner* — John Q Nguyen
*Assistant Examiner* — Michael Kerrigan
(74) *Attorney, Agent, or Firm* — Brinks Gilson & Lione

(57) ABSTRACT

A system and method for determining when to deploy a vehicle safety system includes a processor and inertial sensor. The inertial sensor has a filtered output and an unfiltered or lightly filtered output. The unfiltered or lightly filtered output is in communication with the processor and provides inertial information relating to the vehicle. The filtered output of the inertial sensor is in communication with a vehicle stability control system. The processor is further configured to monitor the unfiltered or lightly filtered output of the inertial sensor and determine if the inertial information indicates that the vehicle has been involved in a collision. If the vehicle has been involved in a collision, the processor is configured to deploy a vehicle safety system.

14 Claims, 4 Drawing Sheets

SYSTEM AND METHOD FOR DETERMINING WHEN TO DEPLOY A VEHICLE SAFETY SYSTEM

BACKGROUND

1. Field of the Invention

The invention generally relates to systems and methods for determining when to deploy a vehicle safety system.

2. Description of Related Art

Vehicle safety systems generally include a variety of different safety systems for preventing injury to an occupant of a vehicle. One well known safety system is an airbag safety system. Essentially, the occupant compartment of the vehicle contains one or more airbag systems. These airbag systems are configured to rapidly inflate when the vehicle is involved in a crash. Airbag systems have become more advanced over the years to include multiple airbags located within the occupant compartment of the vehicle. For example, older airbag systems only had a single airbag coupled to a steering wheel of the vehicle, so that when the vehicle is involved in a frontal crash, the forward momentum of the driver would be reduced by the airbag inflating from the steering wheel of the automobile.

More advanced airbag systems would later be developed to include airbags to slow the momentum of occupants other than the driver of the vehicle is involved in a frontal crash. Additionally, more modern airbag systems contain airbags to reduce the momentum of occupants, when the vehicle is impacted from a side or rear.

In order to determine that the vehicle should deploy one or more airbags, the vehicle generally contains a variety of satellite sensors that are located near the exterior of the vehicle. Essentially, when one of these sensors is actuated, a microprocessor connected to the satellite sensors will determine if an impact has occurred and how severe the impact is. If the impact is severe enough, the microprocessor will deploy the airbag. However, in order to avoid any false positives, the microprocessor is usually connected to one or more accelerometers. If the accelerometers also indicate that the vehicle is in a crash and the accelerometer data provided by the accelerometers agrees with the satellite sensor data, the microprocessor can safely determine that the vehicle has indeed been involved in a collision and that the appropriate safety systems should be deployed.

However, information from the accelerometers must be provided to the microprocessor extremely quickly. Accelerometers that have longer group delays are generally not practical for use in determining to deploy a vehicle safety system. In order to overcome this problem, the current solution is to utilize different accelerometers for different vehicle purposes. For example, accelerometers with longer group delays, can be utilized for other vehicle safety systems, such as rollover detection and stability control.

SUMMARY

A system and method for determining when to deploy a vehicle safety system includes a processor and inertial sensor. The inertial sensor has a filtered output and an unfiltered or lightly filtered output. The unfiltered or lightly filtered output is in communication with the processor and provides inertial information relating to the vehicle. The filtered output of the inertial sensor is in communication with a vehicle stability control system. The processor may be configured to filter the unfiltered or lightly filtered output for inertial measurement unit purposes. The processor is further configured to monitor the unfiltered or lightly filtered output of the inertial sensor and determine if the inertial information indicates that the vehicle has been involved in a collision. If the vehicle has been involved in a collision, the processor is configured to deploy a vehicle safety system.

By so doing, a single inertial sensor can be utilized for determining if a vehicle safety system should be deployed by the processor and also for providing information to the vehicle stability control system. This reduces the costs associated with development of a system because only a single inertial sensor is required instead of multiple inertial sensors as required in the prior art.

Further objects, features and advantages of this invention will become readily apparent to persons skilled in the art after a review of the following description, with reference to the drawings and claims that are appended to and form a part of this specification.

DETAILED DESCRIPTION

Figure 1:
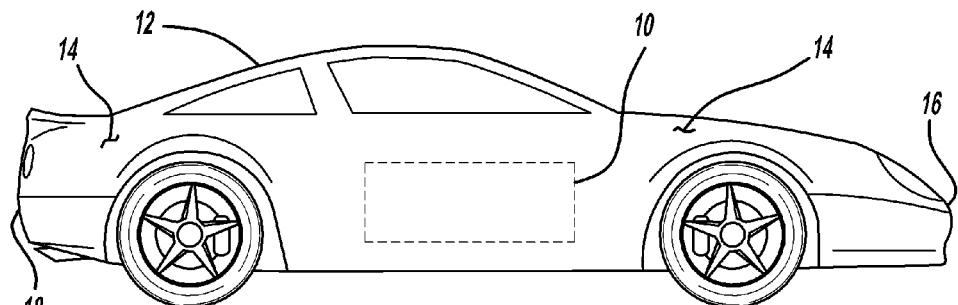
FIG. 1 illustrates a vehicle having a system for determining when to deploy a vehicle safety system.

Referring to FIG. 1, a system 10 for determining when to deploy a vehicle safety system is shown. The system 10 is generally located within a vehicle 12. The vehicle 12 may be any kind of vehicle having a vehicle safety system. For example, the vehicle 12 may be an automobile, truck, tractor trailer, construction equipment, or farm equipment. Additionally, the vehicle may not necessarily be a land based vehicle, but may also include non land based vehicles such as watercraft, aircraft, or any other vehicle capable of transporting persons from one location to another.

In this embodiment, the vehicle 12 is an automobile. The vehicle 12 includes a plurality of body panels 14 defining the bodywork of the vehicle 12. Additionally, the vehicle 12 includes a front bumper 16 and a rear bumper 18. The front bumper 16 is utilized to minimize the impact and damage to the vehicle 12 when the vehicle 12 is in a front collision. Similarly, the rear bumper 18 is utilized to minimize the damage to the vehicle 12 by absorbing some of the impact of an object colliding with the rear of the vehicle 12. If the impact to the vehicle 12 is severe enough, the system 10 will deploy a vehicle safety system.

Figure 2:
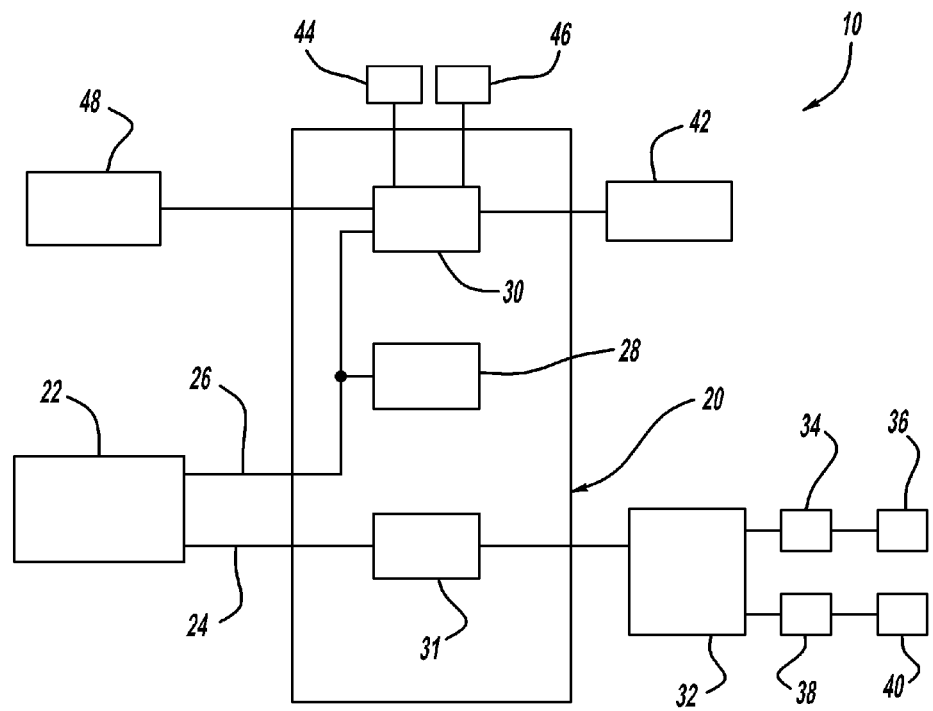
FIG. 2 is a more detailed illustration of the system for determining when to deploy a vehicle safety system.

Referring to FIG. 2, a more detailed illustration of the system 10 is shown. As its primary components, the system 10 includes a processor 20 and an inertial sensor 22. The inertial sensor 22 may be a SMI540 manufactured by Robert Bosch GmbH of Gerlingen, Germany. The inertial sensor 22 has a filtered output 24 and an unfiltered or lightly filtered output 26. The unfiltered or lightly filtered output 26 is in communication with an inertial measurement unit diagnostic logic 28 and crash logic 30 of the processor 20. The filtered output 24 of the inertial sensor 22 is in communication with an inertial measurement unit logic 31 of the processor 20.

The processor 20 is also in communication with a vehicle stability control system 32. The vehicle stability control system 32 may be in communication with a powertrain control module 34 which controls the powertrain 36 of the vehicle 12. Additionally or alternatively, the vehicle stability control system 32 may be in communication with a brake control unit 38 for controlling at least one brake 40 of the vehicle 10. Further, the vehicle stability control system 32 may be incorporated into the inertial measurement unit logic 31 of the processor 20.

The vehicle stability control system 32 receives information from the processor 20 and, more specifically, the inertial measurement unit logic 31 of the processor 20. As stated previously, the inertial measurement unit logic 31 of the processor 20 receives information from the filtered output 24 of the inertial sensor 22. Generally, the group delay for data provided to the filtered output 24 is approximately nine milliseconds. This delay is acceptable for applications related to vehicle stability control. The vehicle stability control system 32 improves safety of the vehicles 12 stability by detecting and minimizing skids. When the vehicle stability control system 32 detects loss of steering control of the vehicle 12, the vehicle stability control system 32 automatically applies the brakes and/or adjusts the powertrain 36 to counter oversteer or understeer.

The system 10 also includes at least one vehicle safety system 42. The vehicle safety system 42 may be any one of variety of different active or passive safety systems, such as an airbag. The crash logic 30 of the processor 20 will receive data from the unfiltered or lightly filtered output 26 of the inertial sensor 22. While this unfiltered or lightly filtered output 26 from the inertial sensor 22 is not as filtered as filtered output 24, the group delay is generally much shorter than the filtered output 24. For example, the group delay of the unfiltered or lightly filtered output 26 may only be two milliseconds or less. Further, the transfer function for the unfiltered or lightly filtered output is out=in·$(z^0+4z^{-1}+8z^{-2}+10z^{-3}+8z^{-4}+4z^{-5}+z^{-6})$ which has linear phase and therefore constant group delay, of approximately two milliseconds.

The crash logic 30 of the processor 20 receives the information from the unfiltered or lightly filtered output 26 of the inertial sensor 22 and determines if the vehicle has been in a collision. If the vehicle 12 has been in a collision, the crash logic 30 of the processor 20 will deploy the vehicle safety system 42, which as previously stated, may be an airbag.

The system 10 may also optionally include one or more satellite sensors 44 and 46. The satellite sensors 44 and 46 are generally located on the exterior of the automobile 12. For example, referring to FIG. 1, the satellite sensors 44 and 46 may be located on or near the front bumper 16, rear bumper 18, or any of the body panels 14. The satellite sensors 44 and 46 communicate to the crash logic 30 of the processor 20 if a physical impact has occurred. The crash logic 30 can than verify information from the sensors 44 and 46 by looking at information provided by the inertial sensor 22 via the unfiltered or lightly filtered output 26. If the sensors 44 and 46 indicate that a collision has occurred, and the information received from the unfiltered or lightly filtered output 26 of the inertial sensor 22 also indicates that a collision has occurred, the appropriate safety system 42 will be deployed.

The system 10 may also include an additional accelerometer 48 in communication with the crash logic 30 of the processor 20. The additional accelerometer 48 can provide additional crash information to the crash logic 30 of the processor 20. For example, accelerometer 48 may be the primary input to the crash logic 30. Additional inputs may be included to provide confirmation of the data observed from accelerometer 48. If sensors 44 and 46 are present, sensors 44 and 46 may take precedence over unfiltered or lightly filtered output 26 because the sensors 44 and 46 are mounted at the vehicle exterior and therefore produce an output signal earlier than unfiltered or lightly filtered output 26. Therefore, unfiltered or lightly filtered output 26 could then be used for redundancy in case of failure of sensors 44 and 46.

Figure 3:
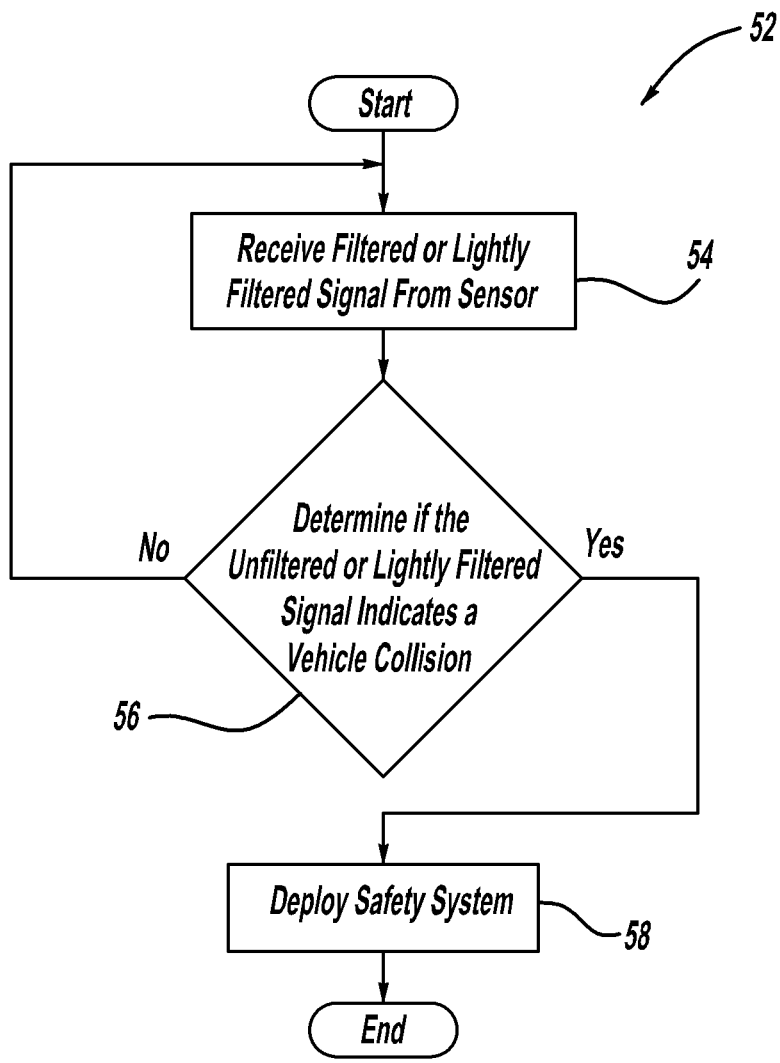
FIG. 3 illustrates a method for determining when to deploy a vehicle safety system.

Referring to FIG. 3, a method 52 for determining when to deploy a vehicle safety system is shown. Reference will also be made to FIG. 2 when describing the method 52 of FIG. 3. The method 52 begins with step 54, wherein the processor 20 receives an unfiltered or lightly filtered signal from the output 26 of the inertial sensor 22. In step 56, the method 52 determines if the unfiltered or lightly filtered signal indicates that the vehicle has been in a collision. In step 58, the logic 52 deploys the vehicle safety system 46 if the unfiltered or lightly filtered signal indicates a vehicle collision. Otherwise, the method 52 returns to step 54.

Figure 4:
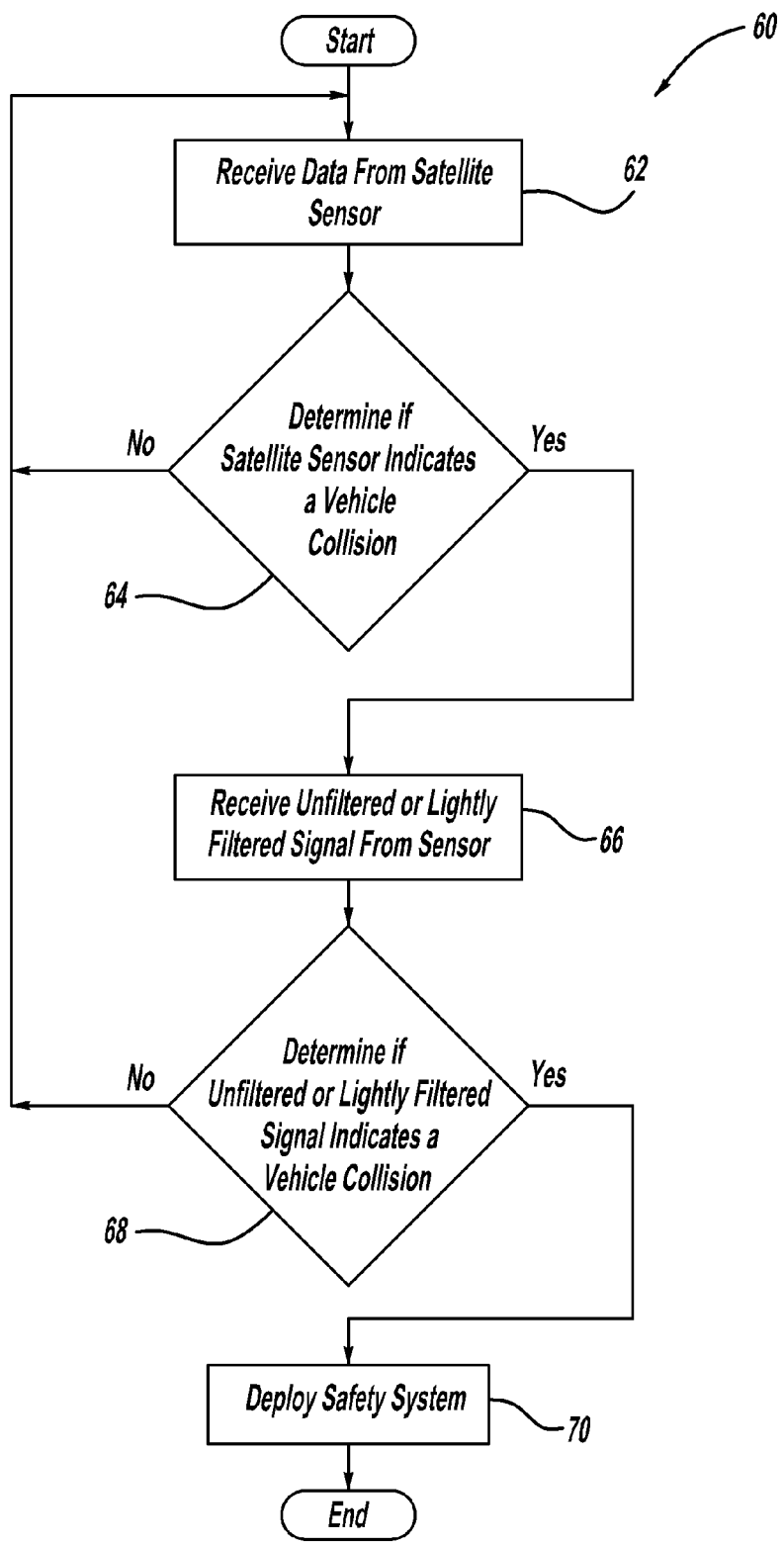
FIG. 4 illustrates another method for determining when to deploy a vehicle safety system.

Referring to FIG. 4 another method 60 for determining when to deploy a vehicle safety system is shown. Like before, reference will be made to FIG. 2 when describing the method 60 of FIG. 4. The method 60 begins with step 62, wherein the processor 20 receives data from one of the satellite sensors 44 and 46. In step 64, the processor 20 determines if the satellite sensors 44 or 46 indicate that the vehicle has been involved in a collision. If the answer is no, the method 60 returns to step 62.

However, if the answer to step 64 is yes, the method continues to step 66 wherein the processor 20 receives unfiltered or lightly filtered signal form the inertial sensor 22 via output 26. Thereafter, in step 68 the processor determines if the unfiltered or lightly filtered signal indicates if the vehicle has been involved in a collision. If the answer to step 68 is no, the method returns to step 62. However, if the answer to the step 68 is yes, the processor 20 deploys the vehicle safety system 42, as shown in step 70.

Figure 5:
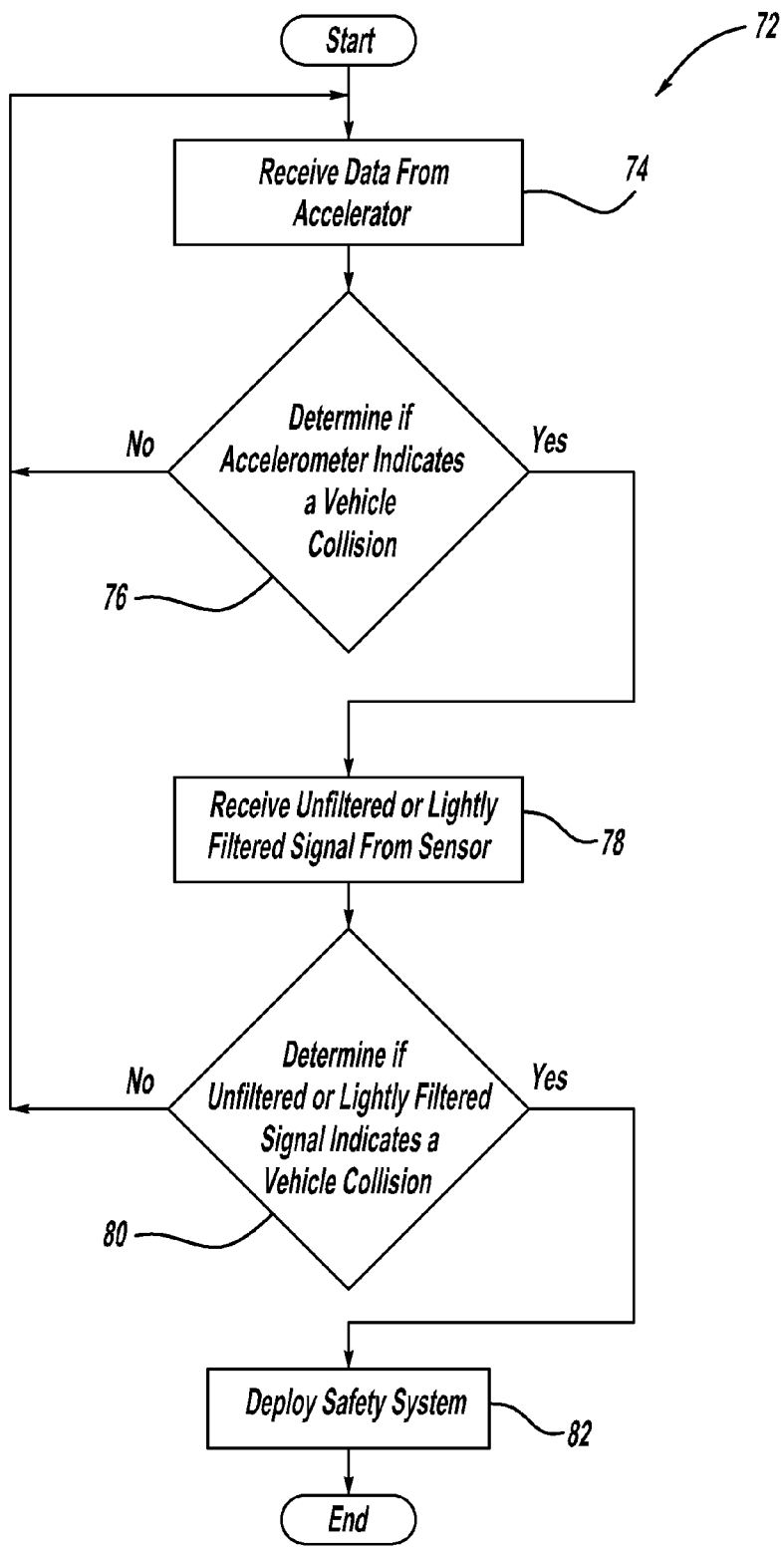
FIG 5 illustrates yet another method for determining when to deploy a vehicle safety system.

Referring to FIG. 5 another method 72 for determining when to deploy a vehicle safety system is shown. Like before, reference will be made to FIG. 2 when describing the method 72 of FIG. 5. The method 72 begins with step 74, wherein the processor 20 receives data from the accelerometer 48. In step 76, the processor 20 determines if the accelerometer 48 indicates that the vehicle has been involved in a collision. If the answer is no, the method 72 returns to step 74.

However, if the answer to step 76 is yes, the method continues to step 78 wherein the processor 20 receives unfiltered or lightly filtered signal form the inertial sensor 22 via output 26. Thereafter, in step 80 the processor determines if the unfiltered or lightly filtered signal indicates if the vehicle has been involved in a collision. If the answer to step 80 is no, the method returns to step 74. However, if the answer to the step 80 is yes, the processor 20 deploys the vehicle safety system 42, as shown in step 82.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

I claim:

1. A system for determining when to deploy a deployable vehicle safety system, the system comprising:
   a processor;
   a single inertial sensor, the inertial sensor producing both a first output and a second output, the first output having a longer group delay than the second output and the second output having a shorter group delay than the first output, wherein the second output is supplied to the processor and provides inertial information for the deployable vehicle safety system, and the first output is supplied to the processor and provides inertial information for a vehicle stability control system;
   where the processor is configured to use the first output for stability control of the vehicle;
   wherein the processor is configured to monitor the second output of the inertial sensor to determine if the inertial information from the second output indicates that the vehicle has been in a collision; and
   wherein the processor is configured to deploy the deployable vehicle safety system upon determining based on the inertial information from the second output that the vehicle has been in a collision.

2. The system of claim 1, wherein the deployable vehicle safety system is an airbag.

3. The system of claim 1, further comprising:
   at least one satellite sensor mounted adjacent to a bumper of the vehicle and being in communication with the processor, wherein the at least one satellite sensor outputs vehicle impact information to the processor;
   wherein the processor is configured to deploy the deployable vehicle safety system when the inertial information from the second output indicates that the vehicle has been in a collision and the at least one satellite sensor indicates that the vehicle has been in a collision.

4. The system of claim 1, further comprising:
   a brake control module in communication with the vehicle stability control system;
   at least one vehicle brake unit in communication with the brake control module;
   wherein the vehicle stability control system is configured to engage the at least one vehicle brake via the brake control module when the inertial information from the first output indicates that the vehicle is not stable.

5. The system of claim 1, further comprising:
   a powertrain control module in communication with the vehicle stability control system;
   a vehicle powertrain in communication with the powertrain control module;
   wherein the vehicle stability control system is configured to engage the powertrain via the powertrain control module when the inertial information from the first output indicates that the vehicle is not stable.

6. The system of claim 1, wherein the inertial sensor is configured to apply a transfer function $(z^0+4z^{-1}+8z^{-2}+10z^{-3}+8z^{-4}+4z^{-5}+z^{-6})$ for generating the second output.

7. The system of claim 1, wherein a group delay for the second output is about 2 milliseconds or less.

8. A method for determining when to deploy a deployable vehicle safety system, the method comprising the steps of:
   receiving from a single inertial sensor both a first output and a second output, wherein the second output has a shorter group delay than the first output and provides inertial information for the deployable vehicle safety system, and the first output has a longer group delay than the second output and provides inertial information for a vehicle stability control system;
   monitoring the second output of the inertial sensor to determine if the inertial information from the second output indicates that the vehicle has been in a collision; and
   deploying the deployable vehicle safety system when the inertial information from the second output indicates that the vehicle has been in a collision.

9. The method of claim 8, wherein the deployable vehicle safety system is an airbag.

10. The method of claim 8, further comprising the step of deploying the deployable vehicle safety system when the inertial information from the second output indicates that the vehicle has been in a collision and at least one satellite sensor indicates that the vehicle has been in a collision.

11. The method of claim 8, further comprising the step of engaging at least one vehicle brake via a brake control module when the inertial information from the first output indicates that the vehicle is not stable.

12. The method of claim 8, further comprising the step of engaging a powertrain via a powertrain control module when the inertial information from the first output indicates that the vehicle is not stable.

13. The method of claim 8, wherein the inertial sensor is configured to apply a transfer function $(z^0+4z^{-1}+8z^{-2}+10z^{-3}+8z^{-4}+4z^{-5}+z^{-6})$ for generating the second output.

14. The method of claim 8, wherein a group delay for the second output is about 2 milliseconds or less and wherein the first output has a group delay at least twice as long as the second output.

* * * * *